(12) United States Patent
Timmings

(10) Patent No.: US 6,402,176 B1
(45) Date of Patent: Jun. 11, 2002

(54) FIFTH WHEEL COUPLER

(75) Inventor: Neil Timmings, Wigan (GB)

(73) Assignee: Fontaine International Europe LTD, Lancashire (GB)

( * ) Notice: Subject to any disclaimer, the term of this patent is extended or adjusted under 35 U.S.C. 154(b) by 0 days.

(21) Appl. No.: 09/664,404

(22) Filed: Sep. 18, 2000

(30) Foreign Application Priority Data

Oct. 1, 1999 (GB) .............................................. 9923128

(51) Int. Cl.⁷ .............................................. B62D 53/12
(52) U.S. Cl. ...................................... 280/433; 280/434
(58) Field of Search ............................... 280/433, 434, 280/435, 421, 436, 437

(56) References Cited

U.S. PATENT DOCUMENTS

| | | | |
|---|---|---|---|
| 2,471,854 A | * 5/1949 | Bies et al. | ................... 280/433 |
| 5,028,067 A | 7/1991 | Madura | |
| 5,069,472 A | 12/1991 | Parr et al. | |
| 5,176,396 A | 1/1993 | Hawthorne et al. | |
| 5,623,335 A | 4/1997 | Kelly | |
| 6,092,825 A | * 7/2000 | Flater | ......................... 280/433 |

FOREIGN PATENT DOCUMENTS

| | | |
|---|---|---|
| EP | A20885800 | 12/1998 |
| EP | A30885800 | 12/1998 |
| GB | 1593625 | 7/1981 |
| GB | 2082131 | 3/1982 |
| GB | 2236729 | 4/1991 |
| JP | 5279430 | 4/1977 |
| WO | 967519 | 12/1996 |

* cited by examiner

*Primary Examiner*—Anne Marie Boehler
(74) *Attorney, Agent, or Firm*—Dennison, Schultz & Dougherty

(57) ABSTRACT

A manually actuable release arm of a fifth wheel coupling is engagable with a plate in a first position wherein the locking member is retracted to allow release (or entry) of a king pin and in a second position wherein the member is projected to hold a locking jaw in its king pin locking position. This may be accomplished by respective engagement of detents in the release arm with the edge of an aperture in the plate flange. To assist release of the king pin, a piston of a fluid actuable piston and cylinder arrangement (38, 39) is connected to the release arm and can be operated to move the release arm against the bias of spring to its first (release) position. In this respect, a plunger on the release arm may be used to actuate a switch which operates the piston.

5 Claims, 4 Drawing Sheets

FIFTH WHEEL COUPLER

TECHNICAL FIELD OF THE INVENTION

This invention concerns a fifth wheel coupling for mounting on a towing vehicle for co-operation with a king-pin mounted on a trailer.

BACKGROUND ART

One known form of fifth wheel coupling is disclosed in GB2236729. Another known form of fifth wheel coupling is disclosed in the applicants' own earlier GB2 342 334. In both of these cases the coupling comprises a plate having a slot for reception of the king-pin, a pivotally mounted jaw arranged adjacent the slot and movable between an open position and a closed position in which it can co-operate with the king-pin to retain it in the slot, and a locking member displaceable between a locking position, in which it serves to maintain the jaw in its closed position, and a release position in which it allows the jaw to open. The locking member is itself connected to a pivotally mounted linkage mechanism which includes a release arm. The release arm is engageable with the plate in a first position in which the linkage mechanism holds the locking member in its release position and in a second position in which the linkage mechanism holds the locking member in its locking position.

As the king-pin enters the slot it causes the jaw to pivot into its closed position. This releases the locking member so that it is urged into its locking position by spring means acting on the linkage mechanism. At the same time this brings the release arm into engagement with the plate in its second position.

In the coupling shown in GB2236729 an additional locking device is provided in the form of a spring snap hook which is manually engaged through aligned apertures in the release arm and the plate. This is to ensure that the release arm remains in engagement with the plate in its second (locking) position and is not inadvertently dislodged while the coupling is in use.

OBJECT OF THE INVENTION

It is desirable that movement of the release arm to its first position and the associated linkage mechanism, including the locking member, to its release position should be easy to accomplish, when required, with minimum manual effort.

An object of the invention is to provide an improved fifth wheel coupling which incorporates this feature.

SUMMARY OF THE INVENTION

With this object in view, the invention provides a fifth wheel coupling for mounting on a towing vehicle for co-operation with a king-pin mounted on a trailer, the coupling comprising a plate having a slot for reception of the king-pin, a pivotally mounted locking mechanism whereby the king-pin can be retained in the slot, said mechanism including a release arm which is engageable with the plate in a first position, wherein the mechanism is held in its release position, and in a second position, wherein the mechanism is held in its locking position, and a fluid actuatable piston and cylinder arrangement, the piston of which is connected to the release arm, in which respect the piston is actuatable to move the release arm, against spring bias, into its first position, whereby the locking mechanism is capable of releasing the king-pin.

Switch means for actuating the piston and cylinder arrangement may conveniently be mounted on the release arm.

In practical embodiments a plunger may be slidably mounted on the release arm to serve as an additional locking device maintaining the release arm in engagement with the plate in its second position, and this plunger may advantageously serve the further purpose, as it slides relative to the release arm, of actuating the piston. In this respect, a suitable practical arrangement may be for the plunger to be spring biased into a first position in which it acts as the additional locking device and to be withdrawn against spring bias until it actuates the switch means for power assisted release of the coupling.

Engagement of the release arm with the plate in the first and second positions referred to may conveniently be by respective recesses or detents in the release arm engaging the edge of a slot in the plate. The plunger may then serve as an additional locking device by being arranged for projection through the slot in addition to the release arm. Preferably it is projectable through the slot only once engagement of the respective release arm recess holding it in its second position has been accomplished.

In this respect, a stop block may be mounted adjacent the slot so as to block entry of the plunger into the slot until the said recess has engaged there with. Such entry or non-entry of the plunger into the slot is preferably visible to a user of the coupling so that it is apparent whether or not reliable locking of the coupling has been achieved.

BRIEF DESCRIPTION OF DRAWINGS

The present invention will now be more particularly described with reference to the accompanying drawings in which.

DETAILED DESCRIPTION OF ILLUSTRATED EMBODIMENT

Figure 1:
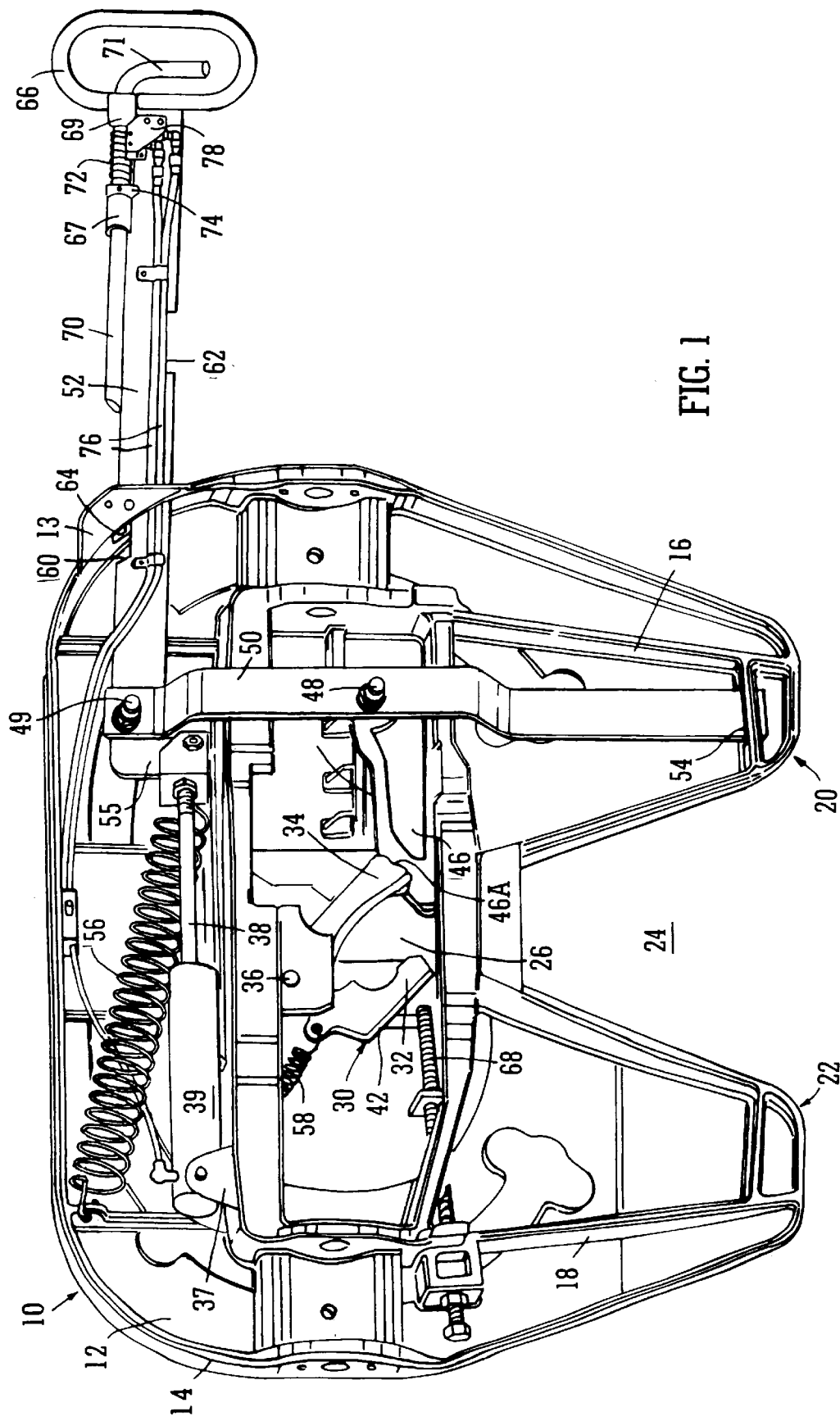
FIG. 1 is a bottom plan view of one form of fifth wheel coupling according to the present invention with the coupling arranged to receive a waisted king-pin of a trailer.
Figure 2:
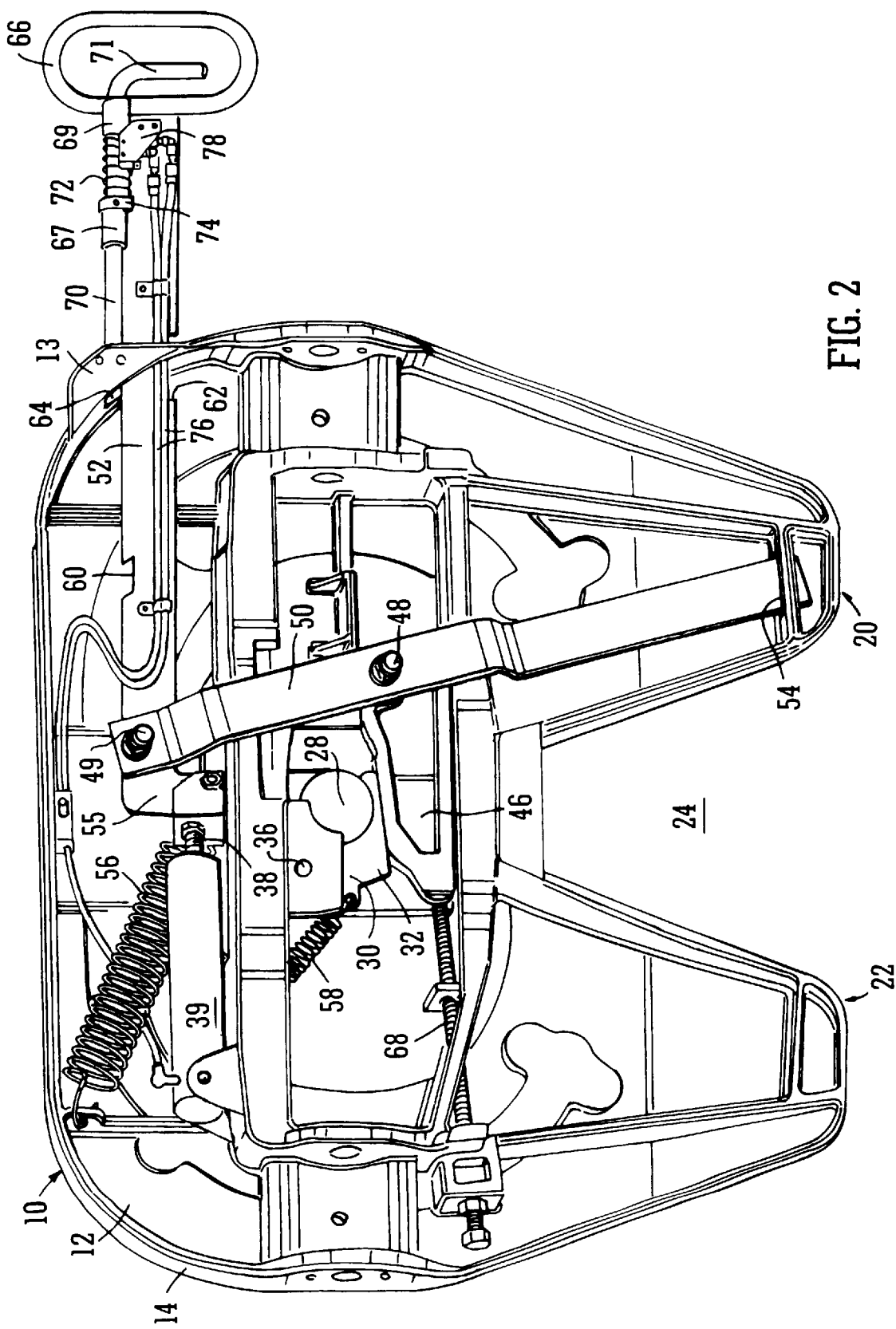
FIG. 2 shows the fifth wheel coupling as in FIG. 1 but with a waisted king-pin held in position by a hooked jaw and a locking member maintaining the jaw in a closed position.
Figure 3:
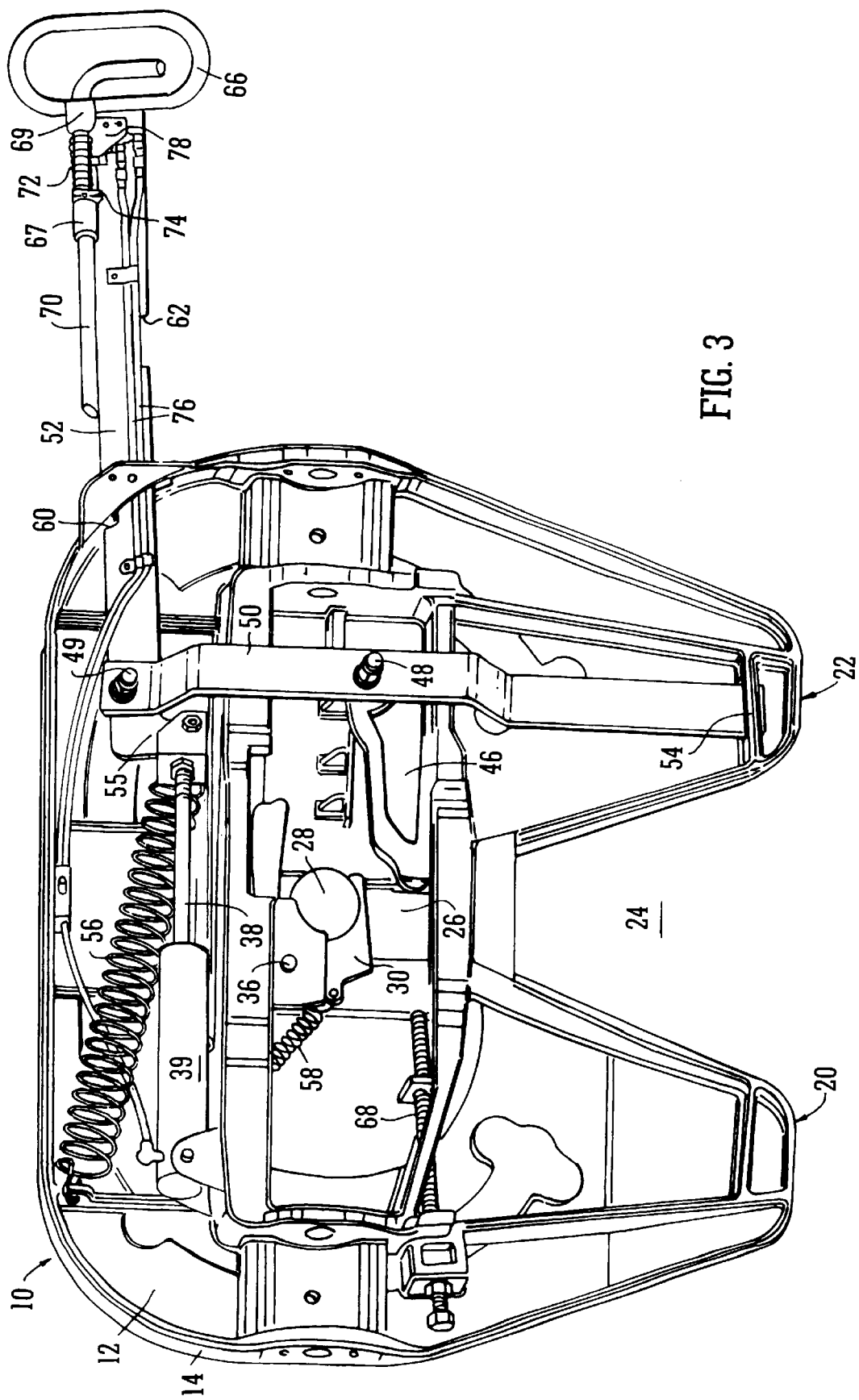
FIG. 3 shows the coupling of FIGS. 1 and 2 with the locking member of the coupling retracted prior to disengagement of the king-pin from the coupling.

Referring to FIGS. 1 to 3 of the drawings, there is shown a fifth wheel coupling (10) comprising a top plate (12) having a peripheral flange (14) and strengthening webs (16, 18).

The top plate (12) has two rearwardly diverging leg portions (20, 22), the inner edges of which define an opening (24) leading into a longitudinally elongate slot (26). In use, a king-pin (28) of a trailer (not shown) which is to be attached to the towing vehicle (not shown) on which the coupling (10) is mounted, is intended to be guided into the slot (26) via the opening (24).

The king-pin (28) is of a type conforming to international standards and has a waisted part situated between upper and lower enlarged flanges.

A hooked coupler jaw (30) is provided for retaining the king-pin (28) in the slot (26) when the vehicle and trailer are connected together. The coupler jaw (30) is fabricated in one piece to include a hook portion (32) and a sensor arm (34) and is pivotally mounted on the plate (12) by means of a mounting pin (36).

The coupler jaw (30) is biased to an open condition by a spring (58) which is attached between the coupler jaw and the plate (12).

A locking member (46) is pivotally mounted at (48) and is arranged to move transversely of the slot (26) between a position withdrawn clear of the slot (26) (see FIGS. 1 and 3) and a locked position (FIG. 2) in which the locking member (46) retains the jaw (30) around the king-pin (28).

The locking member (46) is pivotally mounted (at 48) to a link (50) of a linkage mechanism which also includes a release arm (52). At one end, the link (50) is pivotally mounted (at 49) to the release arm (52). At the other end, the link (50) is loosely mounted in a slot provided in a web (54) which extends between the web (16) and the peripheral flange (14).

The end of the release arm (52) is cranked, substantially at right angles, just beyond the pivotal connection (49) to the link (50). Its cranked end portion (55) is connected to the web (18) by a tension spring (56).

The release arm (52) is provided with two detents (60, 62) which co-operate with opposite sides of a slot (64) formed in the peripheral wall (14), as will be described below. At the free end of the release arm (52) there is a looped handle (66). A pair of guides (67, 69) are mounted on the release arm (52) and a plunger (70) is slidably mounted through these. A helical spring (72) is arranged around the plunger (70) and acts between a fixed member or lug (74) on the plunger and the guide (69) to urge the plunger towards the plate (12), as shown in FIG. 1.

A fluid actuated piston and cylinder arrangement in the form of a pneumatically powered ram (38) and its associated cylinder (39) are mounted centrally to the plate (12) by way of a bracket (37). The ram (38) is pivotally connected to the cranked end portion of the release arm (52).

Air lines (76) for supply of compressed air to the cylinder (39) to project the piston (38) and for release of air therefrom to allow retraction of the piston (38) are fixed along the release arm (52), and switch means (78) for these air lines (76) are mounted near the handle (66) for actuation by the member (74) on the plunger (70), when the plunger is pulled back, by way of its cranked end (71) against the force of the spring (72).

The arrangement of the coupler jaw (30) as shown in FIG. 1 is such that the fifth wheel coupling can receive a king-pin of a trailer. In this respect, the sensor arm (34) of the jaw (30) engages with the locking member (46) so as to counteract the bias of the spring (56) which is tending to pivot the link (50) and hence move the locking member (46) transversely across the slot (26).

In operation of the coupling, as the king-pin (28) of the trailer enters the slot (26) it contacts the sensor arm (34) and rotates the coupler jaw (30) about the pivot (36), tensions the spring (58) and disengages the sensor arm (34) from the locking member (46). The tension in the spring (56) can now move the link (50) and the release arm (52) thereby moving the locking member (46) across the slot (26) so that it engages below the hooked portion (32), as shown in FIG. 2. This locks the jaw (30) in position and prevents the king-pin (28) from becoming disengaged.

As will be seen from FIG. 2, an adjustable stop (68) is provided to limit the transverse movement of the locking member (46).

As shown in FIG. 2 it is actually the engagement of the detent (62) of the of the release arm (52) in the slot (64) in the flanged rim (14) which locks the member (46) in position, i.e. prevents it inadvertently disengaging.

Adjacent the slot (64), an enlarged flange area (13) is provided on the plate (12). As shown in FIGS. 4 to 9, a stop block (65) is mounted on this flange area (13).

As the coupling mechanism is closing, the detent (62) in the arm (52) reaches the flange (14). The force of the main spring (56) causes the arm (52) to pivot about the bolt (49) which connects the arm (52) to the linkage lever (50). This rotation ensures that the detent (62) is urged into positive engagement with the edge of the slot (64) in the flange (14). Once this occurs, and it happens automatically, the mechanism is prevented from opening.

The plunger (70) serves as a secondary locking device to prevent dislodgement of the detent (62) from the slot (64) in a particularly simple and failsafe manner.

Figure 4:
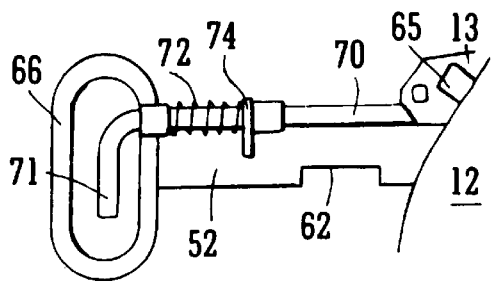
FIGS. 4 to 6 are reduced scale, diagrammatic, partial top plan views showing the sequence for locking the coupling in the condition shown in FIG. 2.
Figure 5:
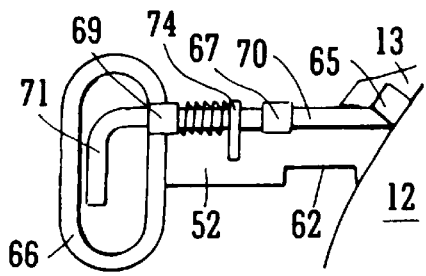
Figure 6:
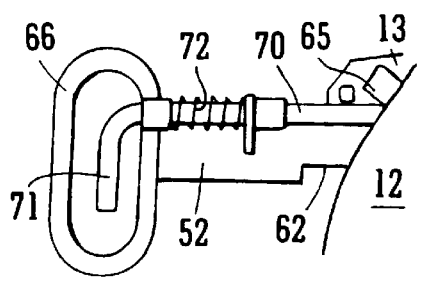

With reference to FIG. 4, the plunger (70) moves with the release arm (52) and approaches the stop block (65) as the arm (52) is retracted owing to the pivoting of the lever (50) under the force of the spring (56). Then, as shown in FIG. 5, the plunger (70) strikes the stop (65). The release arm (52), however, continues to be retracted and this causes compression of the plunger spring (72). As soon as the detent (62) falls into position in engagement with the plate (12), (FIG. 2), a larger gap is created so that the plunger (70) is able to move past the stop block (65) and locate in the slot (64) alongside the arm (52), as shown in FIG. 6. The force of the plunger spring (72) ensures that the plunger (70) reaches the fully locked position. The engagement of the plunger (70) through the slot prevents disengagement of the detent (62). Moreover, the engagement of the plunger (70) in the slot is visually apparent, i.e. it can be seen by a user to be projecting beyond the block (65).

Figure 7:
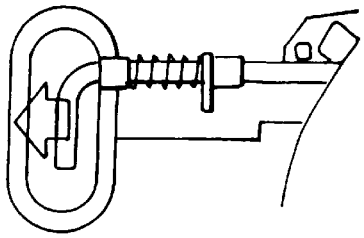
FIGS. 7 to 9 are views comparable to FIGS. 4 to 6 but showing the sequence for unlocking the coupling from the condition shown in FIG. 2 above.
Figure 8:
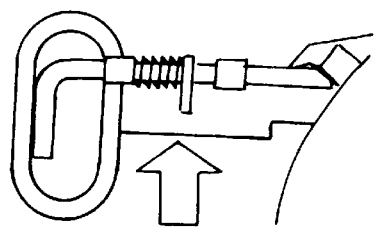
Figure 9:
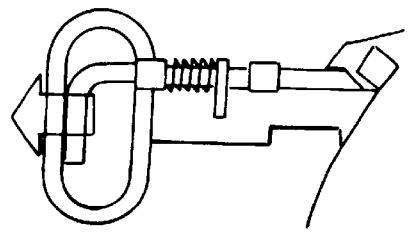

In order for this to take place, the first step to be carried out when uncoupling the fifth wheel mechanism is to pull the plunger (70) towards the handle (66) using the cranked end (71) as shown in FIG. 7. This releases the secondary locking of the release arm (52), as shown in FIG. 8, and is also used to trigger the power assistance of the pneumatic cylinder (39) and its ram (38). As the plunger (70) travels towards the handle (66), the member (74) strikes the switch (78). The switch (78) opens, providing a pressure and flow controlled air supply, via one of the lines (76), to the extension side of the cylinder (79). The ram (38) extends and the release arm (52), owing to it having a cranked end portion (55), is slightly rotated to release the detent (62) from the slot (64) and then pushed outwards, as indicated in FIG. 9, to the position shown in FIG. 3, where the detent (60) latches into the slot instead. This keeps the mechanism open while the kin-pin (28) is withdrawn.

Referring to FIG. 3, in order to allow the king-pin (28) to be withdrawn from the slot (26) the release arm (52) has to be disengaged from the slot (64) and pushed outwardly therefrom so as to tension the spring (56) and withdraw the locking member from its position extending transversely of the slot (26) as shown in FIG. 2 to the position shown in FIG. 3.

The king-pin (28) is still retained in position by the relative position of the tractor and trailer combination. The vehicle to which the fifth wheel coupling (10) is attached can then be moved forwarded of the stationary trailer so that the king-pin (28) on the trailer is withdrawn. As this happens the king-pin (28) causes the coupler jaw (30) to rotate about the pivot (36) and also engages and axially moves the locking member (46) further across the slot (26). This axial movement of the locking member (46) causes the lever (50) to rotate about its pivot (54) in turn moving the arm (52) outwardly. The tension spring (56) then acts to rotate the arm (52) about its pivot (49) on the lever (50) to release the detent (60) from the slot (64). As the king-pin (28) leaves the slot (26) the jaw (30) rotates further and engages with the locking member (46) to prevent the locking member (46) from closing. The locking member (46) is thus re-set ready for coupling, as shown in FIG. 1. The arm (52) and thus the locking member (46) are free to move automatically when the jaw (30) pivots to its closed condition.

The foregoing is illustrative, not limitative of the scope of the invention and many variations in detail are possible within the scope of the invention. In particular, provision of a plunger for purposes of additional locking is not essential to the present invention and need not be provided in other embodiments where actuation of the piston and cylinder arrangement may be accomplished by other means, including simple manual actuation of a switch for power assisted unlocking of the coupling mechanism. Also, other details of the coupling mechanism may vary considerably from those in the illustrated embodiments.

What is claimed is:

1. A fifth wheel coupling for mounting on a towing vehicle for cooperation with a king-pin mounted on a trailer, the coupling comprising a plate having a slot for reception of the king-pin, a pivotally mounted locking mechanism whereby the king-pin can be retained in the slot, said mechanism including a release arm which is engageable with the plate in a first position, wherein the mechanism is held in its release position, and in a second position, wherein the mechanism is held in its locking position, and a fluid actuatable piston and cylinder arrangement, the piston of which is connected to the release arm, in which respect the piston is actuatable to move the release arm, against spring bias, into its first position, whereby the locking mechanism is capable of releasing the king-pin, said coupling further including a switch means for actuating the piston and cylinder arrangement mounted on the release arm, and a plunger slidably mounted on the release arm for actuating the switch means as it slides relative to the release arm, said plunger serving as an additional locking device maintaining the release arm in engagement with the plate in the second position.

2. A coupling as claimed in claim 1 wherein the plunger is spring biased towards a first position in which it will act as an additional locking device and is capable of being withdrawn against said spring bias until it actuates the switch means for the piston and cylinder arrangement.

3. A coupling as claimed in claim 1 wherein respective recesses or detents in the release arm engage the edge of a further slot in the plate in the first and second positions of the release arm and the plunger is arranged on the release arm so as also to be projectable through the further slot.

4. A coupling as claimed in claim 3 wherein the plunger is only projectable through the further slot once the release arm has engaged there with in its second position.

5. A coupling as claimed in claim 4 wherein a stop block is mounted adjacent the further slot so as to block entry of the plunger into said slot until the respective recess or detent of the release arm has engaged therewith.

\* \* \* \* \*